United States Patent [19]

Avramidis et al.

[11] 3,884,097

[45] May 20, 1975

[54] TWO STAGE TRANSMISSION

[75] Inventors: Stellios Antony Avramidis, Greenfield; John L. Craig, Mooresville, both of Ind.

[73] Assignee: FMC Corporation, San Jose, Calif.

[22] Filed: Mar. 21, 1973

[21] Appl. No.: 343,329

[52] U.S. Cl. .................................. 74/740; 74/336
[51] Int. Cl. ............................................ F16h 37/00
[58] Field of Search .................. 74/740, 336, 752 E

[56] References Cited
UNITED STATES PATENTS

| | | | |
|---|---|---|---|
| 694,692 | 3/1902 | Sumner | 74/765 |
| 1,102,378 | 7/1914 | Zeitler | 74/336 |
| 1,795,135 | 3/1931 | Molly | 74/336 |
| 1,797,826 | 3/1931 | Gage | 74/336 X |
| 2,061,832 | 11/1936 | Cotterman | 74/336 |
| 2,343,312 | 3/1944 | Maurer | 74/336 |
| 2,463,100 | 3/1949 | Gredell | 74/336 UX |
| 2,911,856 | 11/1959 | Simpson et al. | 74/740 |

*Primary Examiner*—Samuel Scott
*Assistant Examiner*—John Reep
*Attorney, Agent, or Firm*—C. E. Tripp; J. F. Verhoeven

[57] ABSTRACT

A transmission suitable for snowmobile use has an automatically actuated stage and a manually actuated stage. Each stage is effective to transmit power at two different speed ratios in the forward direction, and, in addition, the manually actuated stage is effective to transmit power at two different speed ratios in the reverse direction. The automatically actuated stage has two series connected trains and the manually actuated stage has a single epicyclic train. The sun gear, the planet gears, and the ring gear of the epicyclic train are continuously meshed, and changes in operation condition of the manual stage are effected by selected coupling and holding of the different units of the train, which can be done without stopping rotation of the elements of the train.

3 Claims, 6 Drawing Figures

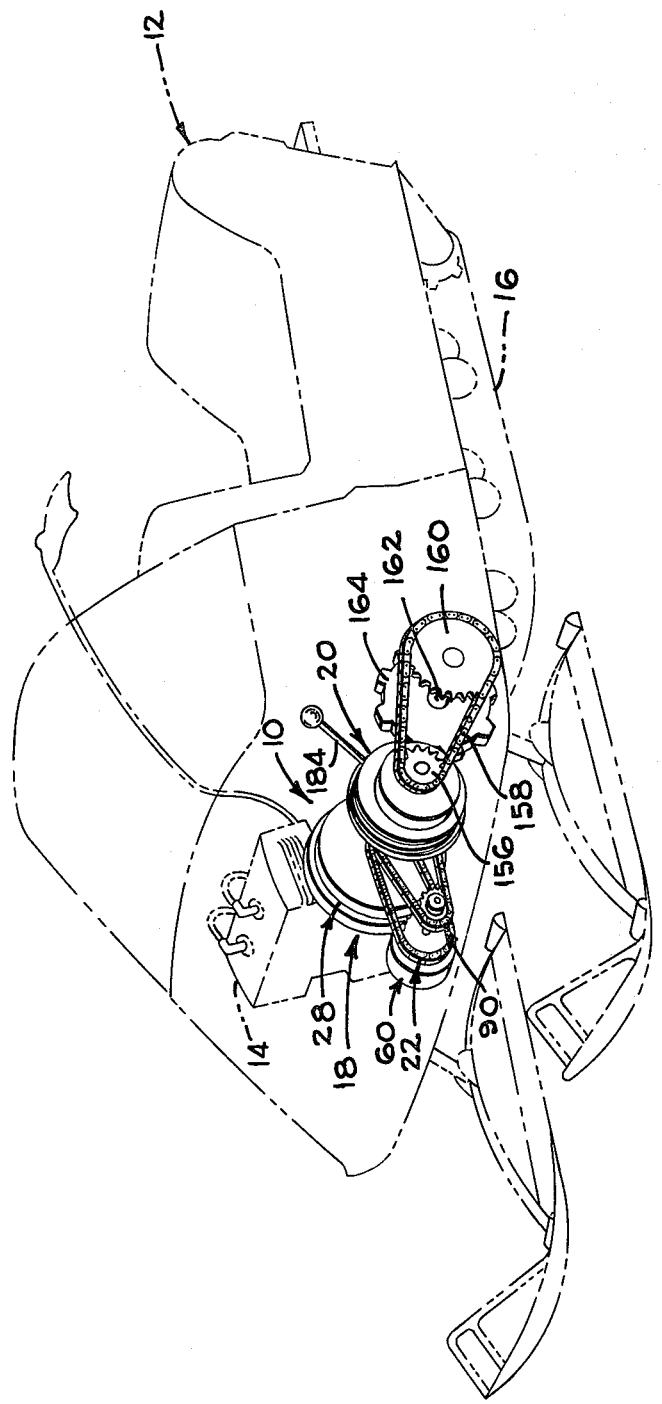

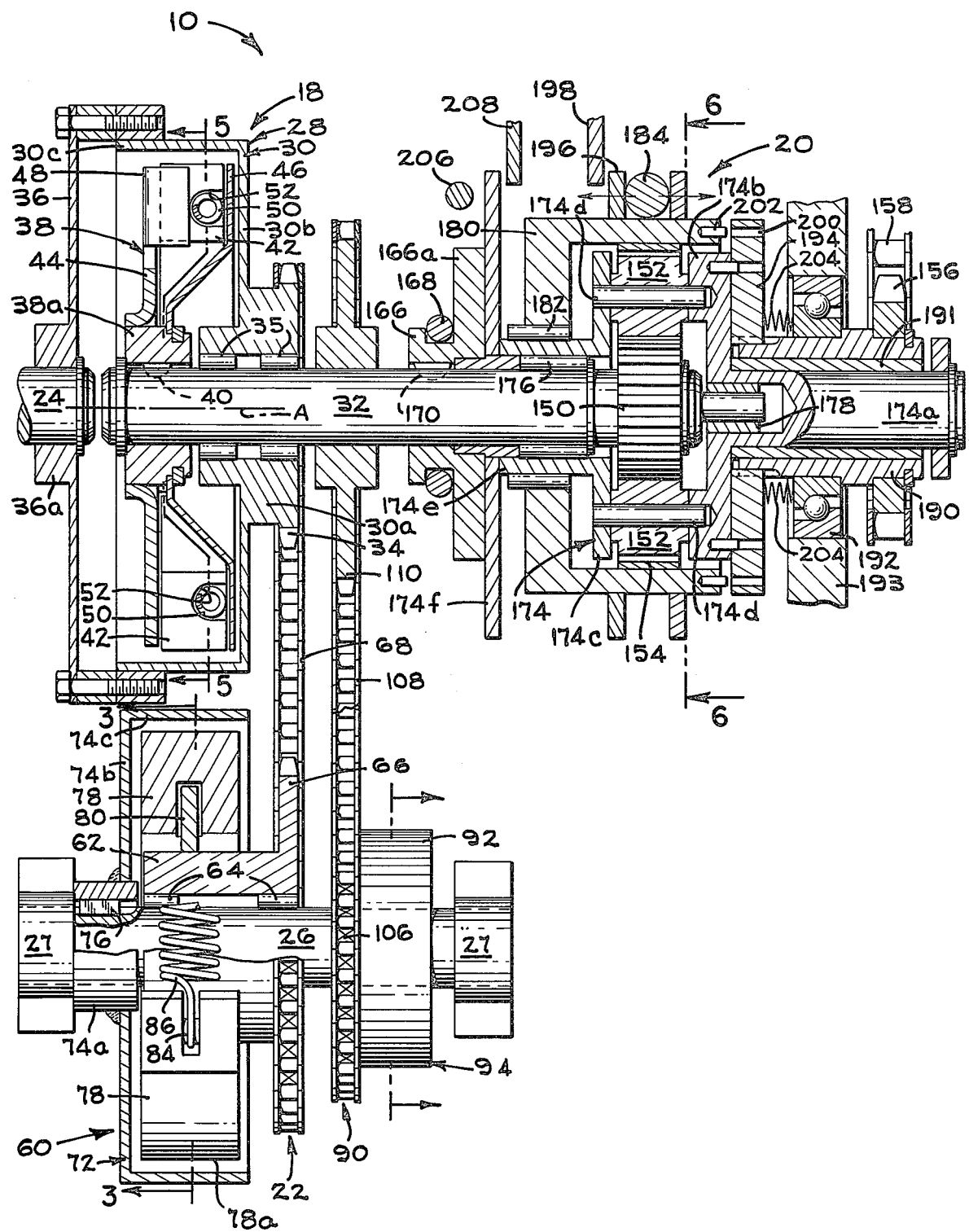
FIG_2

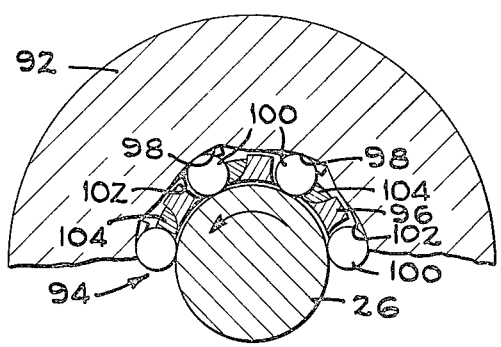
FIG_4
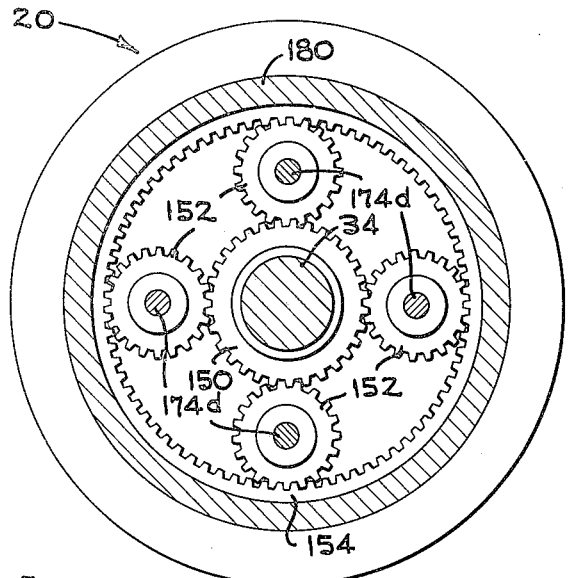
FIG_6
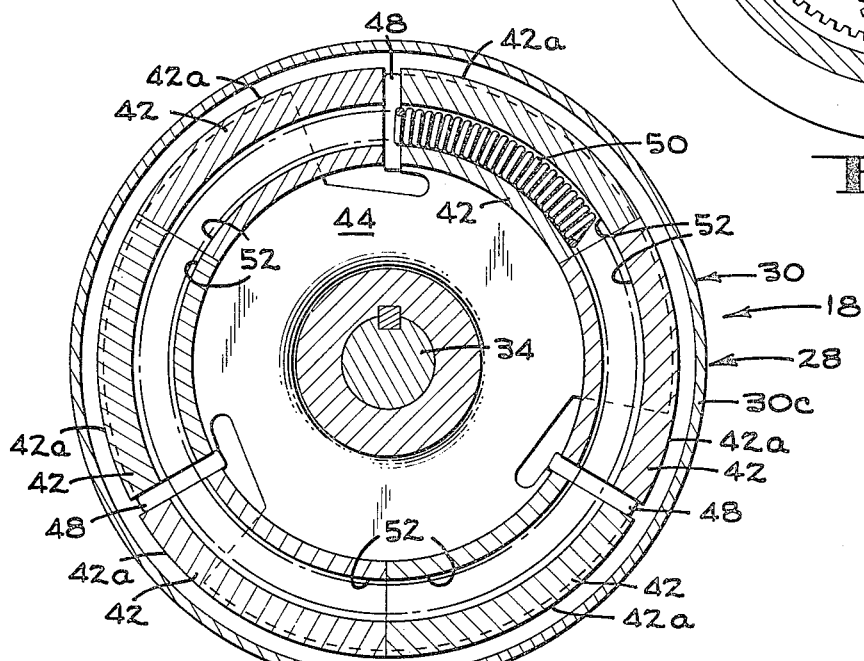
FIG_5
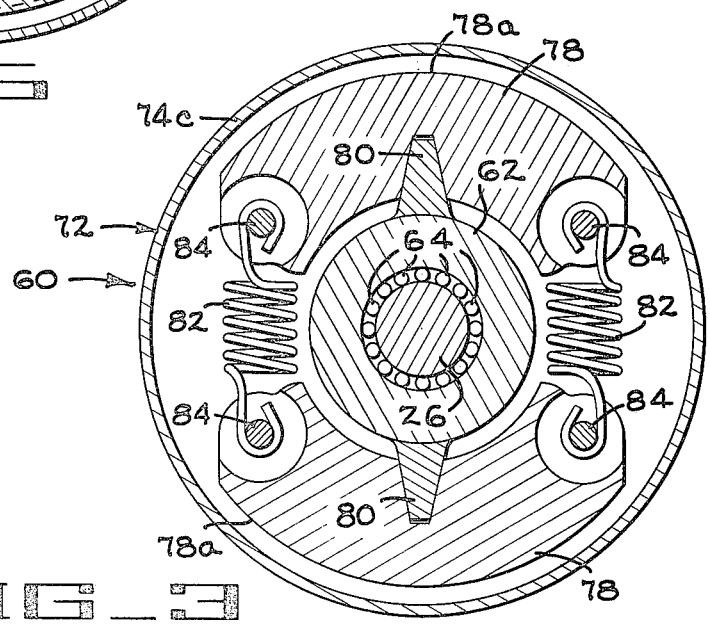
FIG_3

TWO STAGE TRANSMISSION

BACKGROUND OF THE INVENTION

The present invention relates to transmissions and, more particularly, to a transmission suitable for lower powered vehicles, such as a snowmobile.

In recent years there has been developed an increasing array of different types of vehicles suitable for a wide variety of uses. Typically, this type of vehicle is intended for off-the-road use and is generally smaller, and of lower horsepower, than highway vehicles. Among this type of vehicles are snowmobiles, lawn mowers, garden tractors, home snowremovers, motorcycles, recreational vehicles, golf carts, go-carts, small utility vehicles, and other similar vehicles.

Many of this new class of off-the-road vehicles must be suitable for operation under a wide range of operating conditions. For example, a snowmobile must be able to operate efficiently in a deep layer of light powdered snow, or on a slick, hard surface of frozen snow. Obviously, the power requirements and the mode of operation of the snowmobile under these two extreme conditions will be substantially different. Consequently, a transmission is required which will meet the widely different demands on the vehicle.

Other considerations are important for a transmission suitable for these off-the-road vehicles. On the one hand, automatic operation of the transmission is desirable to free the vehicle operator for the challenging demands of off-the-road operation. On the other hand, the widely different conditions under which the vehicle must be operated requires a selectivity of mode of operation not characteristic of conventional automatic operation.

In typical off-the-road vehicle travel, it must be expected that the conditions under which the vehicle is operated, including the surface on which the vehicle runs, will change abruptly and frequently, requiring quick speed and drive ratio changes. Accordingly, it is desirable that the transmission for the vehicle be shiftable, automatically and/or manually, while the vehicle is moving at high or low speeds over the terrain.

Another consideration in transmissions for vehicles of this type relates to the terrain over which the vehicles are driven, and the different conditions under which the vehicles are operated. The use to which a snowmobile is subjected includes racing, hill climbing, endurance runs and the like, making the strength and durability of the transmission of the utmost importance.

SUMMARY OF THE INVENTION

There is provided in the present invention a transmission having an ease of operation characteristic of automatic transmissions coupled with the selectivity of manual transmissions. The simple and durable transmission disclosed produces a surprisingly complete array of modes of possible operation suitable to meet a wide range of demands typical of off-the-road vehicles.

In the transmission of the present invention, an automatic stage has been combined with a manually operable epicyclic stage. Each stage is effective to transmit motion at two different speed ratios so that a vehicle in which the transmission is installed will have four speeds forward. Some of the changes from one speed ratio to the other will be effected automatically while other changes will be selected at the discretion of the operator. In addition to the forward speeds, reverse operation can be selected by the operator. None of the speed changes requires the engagement or disengagement of gears, so the changes can generally be made quickly without clashing of gears or damage to the transmission. Consequently, a shift from one forward speed to another can be made while the vehicle is traveling at a relatively high speed, without having to slow down or wait for gears to mesh.

It is therefore one object of the present invention to provide a small, versatile transmission combining the advantages of an automatic and manual transmission.

It is another object of the present invention to provide a small, rugged transmission for off-the-road vehicles.

It is yet another object of the present invention to provide a multi-speed transmission which does not require the engagement or disengagement of gears to change speed.

BRIEF DESCRIPTION OF THE DRAWINGS

FIG. 1 is a view in perspective of a snowmobile, shown in phantom, in which the transmission of the present invention is incorporated.

FIG. 2 is a view in cross-section of the transmission of the present invention.

FIG. 3 is a view taken on the line 3—3 of FIG. 2.
FIG. 4 is a view taken on the line 4—4 of FIG. 2.
FIG. 5 is a view taken on the line 5—5 of FIG. 2.
FIG. 6 is a view taken on the line 6—6 of FIG. 2.

DESCRIPTION OF THE PREFERRED EMBODIMENT

The transmission 10 of the present invention, which is shown for illustrative purposes mounted in a snowmobile 12, is connected between the engine 14 of the snowmobile, which is the drive member, and the drive track 16 thereof, which is the driven member.

As shown best in FIG. 2, the transmission 10 has two stages connected in series: an automatically shiftable stage 18 and a manually shiftable stage 20.

The automatically shiftable stage 18 has a first motion transmitting, or drive, train 22 which extends between input shaft 24 (on axis A) and auxiliary shaft 26. Shaft 26 is journaled in supports 27, which are shown in FIG. 2 but which have been omitted from FIG. 1 for clarity. The first stage input shaft 24 is a shaft (such as the crankshaft) extending from the engine 14 and rotated by the engine. A centrifugal clutch 28 has an outer member 30 comprising a hub portion 30a, a flange portion 30b extending outwardly from the hub portion, and a rim portion 30c extending rearwardly from the flange portion 30b. A sprocket 34 is formed on the hub portion 30a which is rotatably mounted on a shaft 32 by means of rollers 35.

A cover 36 is secured to the rim portion 30c. The cover 36 has a hub portion 36a which is secured to shaft 24. Thus, it will be seen that there is a positive, unbroken connection between the input shaft 24 and the sprocket 34.

The clutch 28 includes an inner member 39 having a hub portion 38a which is keyed at 40 to shaft 32 (also on axis A) for rotation therewith. Weighted intermediate members 42 are received between a rear flange 44 and a front flange 46 which are secured in and extend from hub portion 38a. The rear flange 44 has forwardly extending flaps 48 to guide radial movement of the intermediate members 42 and to compel their rotary movement with the inner clutch member. The weighted intermediate members each have an arcuate outer surface 42a which engages the rim 30c when the intermediate members move radially outwardly on rotation of shaft 32. A circular endless spring 50 received in channel 52 of the members 42 normally holds the weighted member 42 inwardly, and yields to permit the members 42 to engage rim 30c only after the shaft 32 has reached a predetermined speed. Normally, the outer clutch member 30 can rotate freely relative to the inner clutch member 38 and shaft 32, but when a predetermined speed is reached and the weighted members move into engagement with rim 30c, the inner and outer clutch members become locked for rotation of shaft 32 in unison with shaft 24.

As shown best in FIGS. 2 and 3, another centrifugal clutch 60 has an inner member 52 which is mounted on shaft 26 by means of rollers 64. A sprocket 66 on inner member 62 receives the chain 68, which is also received on sprocket 34, to rotate inner member 62 upon rotation of input shaft 24.

The first motion transmitting train 22 of first transmission stage 18 is thus defined by cover 36, outer clutch member 30, sprocket 34, chain 68, sprocket 66, and inner clutch member 62.

Clutch 60 has an outer member 72 secured to auxiliary shaft 26. Outer member 72 consists of a hub portion 74a, keyed at 76 to shaft 26, a radially extending flange portion 74b, and a forwardly extending rim portion 74c. Clutch 60 also has two intermediate members 78, which constitute heavy masses, mounted on studs 80 extending radially from inner clutch member 62, on diametrically opposite sides thereof. The two opposed intermediate member 78 are connected by two springs 82 which tend to hold the weighted members down on studs 80. The ends of the springs are connected to the respective weights 78 by pins 84. The outer periphery 78a of the intermediate weighted members 78 are circular and of equal radius to the radius of rim portion 74c so that, when the rotation of inner clutch member 62 reaches a predetermined speed, the intermediate members 78 move outwardly, against the bias of springs 82, into gripping engagement with rim 74c. When this occurs, the rotation of input shaft 24 is transmitted, through the first motion transmitting train 22 and outer clutch member 72 to auxiliary shaft 26.

A second motion transmitting, or drive, train 90 extends from auxiliary shaft 26 to shaft 32 which links the first stage of the transmission to the second stage thereof to define a connecting shaft between said stages. Since shaft 32 defines the output shaft of the first stage and the input shaft of the second stage, it will be referred to hereinafter as the output-input shaft. Train 90 includes the outer member 92 of an overrunning clutch 94, which also has an inner member 96 secured to shaft 26. The outer member 92 is mounted over the inner member and, with the inner member, defines pockets 98 for rollers 100. Each pocket has a wedging surface 102 and a spring 104 urging the rollers into the wedging surface to lock shaft 26 to outer member 92. As can be seen from FIG. 4, free relative rotation occurs when there is relative counterclockwise rotation of the outer member 92 with respect to the inner member 96 (or relative clockwise motion of the shaft 26 and inner member 96 with respect to the outer member 92). The members, however, are locked together by the rollers 100 for rotation in unison when the outer member is rotated clockwise relative to the inner member (or the inner member is rotated counterclockwise relative to the outer member).

The outer member 92 has a sprocket 106 secured thereon which receives endless chain 108. The chain 108 is also received on sprocket 110 which is secured to shaft 32. Thus, the second motion transmitting train consists of outer member 92 of overrunning clutch 94, sprocket 106, chain 108, and sprocket 110.

At a low idle speed of input shaft 24, the inner clutch member 62 of the second centrifugal clutch 60 is rotated by the first motion transmitting train 22 but not fast enough to effect engagement of clutch 60 (that is, engagement of the intermediate clutch members 78 with outer clutch member 72). Thus, auxiliary shaft 26 is stationary. The input shaft 24 rotates the outer member 30 of the first centrifugal clutch 28 but rotation of the outer member of the clutch will not produce engagement of the clutch (which occurs on engagement of the intermediate clutch members 48 with outer clutch member 30). Input-output shaft 32 is thus stationary. This condition of the first stage 18 of the transmission is shown in lines 1 of Tables A and B.

TABLE A

| | FIRST STAGE OF TRANSMISSION | |
|---|---|---|
| Input (24) of Transmission | Condition of Trains | Output (32) of First Stage |
| 1. Low Idle | 1st Train (22) Rotating (No Load) 2nd Train (90) Stationary | Stationary |
| 2. Low | 1st Train Rotating Under load 2nd Train Rotating Under Load | Low Speed |
| 3. High Speed | 1st Train Rotating (No Load) 2nd Train Rotating (No Load) | High Speed |

TABLE B

| | FIRST STAGE OF TRANSMISSION | |
|---|---|---|
| Input of Transmission | Condition of Clutches | Output of First Stage |
| 1. Low Idle | 1st Centrifugal Clutch (28) Disengaged 2nd Centrifugal Clutch (60) Disengaged | Stationary |
| 2. Low | 1st Centrifugal Clutch Disengaged 2nd Centrifugal Clutch Engaged | Low Speed |
| 3. High Speed | 1st Centrifugal Clutch Engaged 2nd Centrifugal Clutch Engaged | High Speed |

At an intermediate speed of input shaft 24, clutch 60 engages to drive auxiliary shaft 26. Although clutch 28 remains disengaged, the shaft 32 is driven through the second motion transmitting train 90 for rotation at a low speed. This condition is indicated in lines 2 of Tables A and B.

At a high speed of input shaft 24, both clutches 28 and 60 are engaged. The output shaft 32, under this condition, is driven at a high speed directly from shaft 24 through clutch 28. The chain 108 is driven at a sufficiently high speed to cause the outer member of clutch 94 to overrun the inner member thereof. Therefore, although both chain 68 and chain 108 are rotating, no power is transmitted therethrough since the power is transmitted directly from input shaft 24 through clutch 28 to output-input shaft 32. This condition is indicated in lines 3 of Tables A and B.

The second stage 20 of the transmission includes a sun gear 150, planet gears 152 continuously meshed with the sun gear, and a ring gear 154 encircling the other gears and continuously in mesh with the planet gears. The output sprocket 156 receives chain 158 (see FIG. 1) which drives the snowmobile track through sprocket 160, shaft 162, and track sprocket 164.

The sun gear 150 is mounted on output-input shaft 32 (which, for convenience, may also be referred to as the "sun" shaft) and rotates therewith concentric to axis A and in a fixed axial position. A collar 166 is received on shaft 32 and is axially shiftable thereon by lever 168 between a position as shown in FIG. 2 (which, for convenience, will be referred to as the "right" position) and a "left" position left of the position shown. The collar 166, which is keyed at 170 to shaft 32 for rotation therewith, has a radial flange 166a.

A plurality of planet gears 152 (which may be four as shown in FIG. 6) are mounted on a planet gear carrier 174 which is mounted on bearings 176, 178 received on shaft 32 one either side of sun gear 150, as shown in FIG. 2. The planet gear carrier 174 includes a forwardly extending shaft portion 174a, two radial flanges 174b, 174c on either side of the plane of the planet gears, shafts 174d extending between the flanges 174b, 174c to carry the gears 152, a sleeve portion 174e, and a rear radial flange 174f.

The ring gear 154 is mounted on the inside of a ring gear carrier 180 which is mounted on bearing 182. The ring gear 154 is axially shiftable on bearing 182 (which is mounted on the sleeve portion 174e of planet gear carrier 174) by lever 184 from the "center" position shown in FIG. 2 to a right position (to the right of the position shown) and to a left position (to the left of the position shown).

The output sprocket 156 is mounted on an output member defined by hollow shaft 190 which is mounted on a bushing 191. Bushing 191 is rotatably received on shaft portion 174a of the planet gear carrier. The output member 190 of the second stage is received for rotation in bearing 192 mounted in support 193. A flange 194 is splined to output member 190 for axial movment thereon but without relative rotation with respect thereto. Flange 194 is shiftable on output member 190 between a left position as shown and a right position to the right thereof. The flange 194 has holes 200 therein which receives pins 202 extending from the ring gear carrier 180 and the planet gear carrier 174 when the respective members are brought together for engagement. When the respective members are separated, the pins will leave the holes to permit relative rotation between the members. It should be noted that the flange 194 is biased toward its left position by springs 204.

The second stage of the transmission is shown with the collar lever 168 in the right position, the ring gear carrier 180 in the center position, and the planet gear carrier in its axially fixed position. Under these conditions, collar flange 166a is engaged with planet gear carrier flange 174f for rotation therewith, and planet gear carrier flange 174b is engaged with flange 194 for rotation therewith. When both levers 168 and 184 are shifted to the left, a guide 196 secured to the ring gear carrier 180 engages stationary frame member 198 to hold the ring gear carrier 180 from rotation. The collar 166 is moved to the left to disengage flange 166a from the flange 174f of the planet gear carrier 174 and free the carrier 174 from the output-input shaft 32. The flange 174b of the planet gear carrier 174 remains engaged with flange 194 which is splined to the output member 190 so that the sprocket 156 is driven at a low speed ratio from the output-input shaft 32 through the sun gear 150, planet gears 152, and planet gear carrier 174. This condition of the second stage, wherein the sprocket 156 is driven at a first speed forward when the output-input shaft 32 is driven at a low speed, is shown in line 1 of Tables C, D and E.

TABLE C

SECOND STAGE OF TRANSMISSION

| Input To Second Stage (Output of First Stage) | Collar Lever 168 | Ring Gear Lever 184 | Reverse Lever 206 | Output of Second Stage (156) |
|---|---|---|---|---|
| 1. Low | Left | Left | Left | 1st Speed Forward |
| 2. High | Left | Left | Left | 2nd Speed Forward |
| 3. Low | Right | Center | Left | 3rd Speed Forward |
| 4. High | Right | Center | Left | 4th Speed Forward |
| 5. Low | Left | Right | Right | 1st Speed Reverse |
| 6. High | Left | Right | Right | 2nd Speed Reverse |
| 7. Low or High | Left | Center | Left | High Idle |

TABLE D

SECOND STAGE OF TRANSMISSION

| Input To Second Stage (Output of First Stage) | Rotation of Second Stage Elements | Output of Second Stage |
|---|---|---|
| 1. Low | Sun gear (150) rotating<br>Planet gear carrier (174) Rotating<br>Ring gear (154) stationary (Held) | 1st Speed Forward |
| 2. High | Same as 1st Speed Forward | 2nd Speed Forward |
| 3. Low | Sun gear (150) rotating<br>Planet gear carrier (174) rotating<br>Ring gear (154) rotating | 3rd Speed Forward |
| 4. High | Same as 3rd Speed Forward | 4th Speed Forward |
| 5. Low | Sun gear (150) rotating<br>Planet gear carrier (174) stationary (Held)<br>Ring gear (154) rotating | 1st Speed Reverse |
| 6. High | Same as 1st Speed Reverse | 2nd Speed Reverse |
| 7. Low or High | Sun gear (150) rotating<br>Planet gear carrier (174) stationary (Held)<br>Ring gear (154) (Free Wheeling) | High Idle |

TABLE E

SECOND STAGE OF TRANSMISSION

| Input To Second Stage (Output of First Stage) | Connection of Second Stage Elements | Output of Second Stage |
| --- | --- | --- |
| 1. Low | Planet gear carrier connected to output sprocket<br>Ring gear disconnected from output sprocket and held stationary<br>Planet gear carrier disconnected from sun shaft | 1st Speed Forward |
| 2. High | Same as First Speed Forward | 2nd Speed Forward |
| 3. Low | Planet gear carrier connected to output sprocket<br>Ring gear disconnected from output sprocket and allowed to rotate<br>Planet gear carrier connected to sun shaft | 3rd Speed Forward |
| 4. High | Same as Third Speed Forward | 4th Speed Forward |
| 5. Low | Planet gear carrier disconnected from output sprocket<br>Ring gear connected to output sprocket<br>Planet gear carrier disconnected from sun shaft and held stationary | 1st Speed Reverse |
| 6. High | Same as First Speed Reverse | 2nd Speed Reverse |
| 7. Low or High | Planet gear carrier engaged with output sprocket<br>Ring gear disengaged from output sprocket and allowed to rotate<br>Planet gear carrier disengaged from sun shaft | High Idle |

Under the same condition of the second stage, but with the first stage driven at a high speed, the output sprocket 156 is driven at a second speed forward as shown in lines 2 of Tables C, D and E.

To operate the second stage at a high speed ratio, the ring gear lever 194 is shifted to the center position and the collar lever 168 is shifted to the right position, so that the elements of the second stage are in the positions shown in FIG. 2. Under these conditions, the planet gear carrier 174 is locked, or coupled, to the output-input shaft 32 and to the output member, while the ring gear carrier is free to rotate with respect to support 198. In this condition, the elements of the second stage are coupled together and rotate as a unit, and the output sprocket 156 is rotated at the same speed as the output-input shaft 32. This condition of the second stage elements will produce an output sprocket third speed forward (when the first stage produces a low output speed) and an output sprocket fourth speed forward (when the first stage produces a high output speed), as shown in lines 3 and 4 of Table C, D and E.

For reverse operation, the ring gear lever 184 is shifted to the right position and the collar lever 168 is shifted to the left position. The rightward shifting of the ring gear carrier 180 engages that member with the flange 194 to shift the flange to the right on the output member and disengage the flange 194 from the flange 174b of the planet gear carrier 174. The shifting of the collar member 166 to the left disengages the flange 174f of the planet gear carrier 174 from the collar member (and hence from the output-input shaft 32). Under these conditions, the output sprocket 156 is driven from the output-input shaft through the sun gear 150, planet gear 152, ring gear carrier 180, flange 194 and output member 190. The planet gear carrier 174 is held stationary, as by movement of reverse lever 206 to the right to press the flange 174f against stationary frame member 208. The output sprocket will be driven either at a first speed reverse (if the output of the first stage is a low speed) or at a second speed reverse (if the output of the first stage is a high speed), as shown in lines 5 and 6 of Tables C, D and E.

In the idle condition of the second stage, the ring gear lever 184 is centered (as shown in FIG. 2) and the collar lever 168 is shifted to the left (see line 7 of Table C). In this position of the elements, the planet gear carrier 174 is disconnected from the output-input shaft but is connected to the output member 190. At the same time, the ring gear carrier 180 is disconnected from the output member 190, as shown on line 7 of Tables D and E. Under these circumstances, rotation can be transmitted to the output member 190 neither through the planet gear carrier 174 nor the ring gear carrier 180, and the planet gear carrier 174 is held stationary by the output member.

Thus, it will be seen that in the preferred form of the present invention described, the automatic stage of the transmission consists of coaxial input and output shafts (24 and 32, respectively), and an auxiliary shaft 26 spaced therefrom. A first motion transmitting train 22, including the inner member 62 of a second centrifugal clutch 60, connects the input shaft of the first stage to the auxiliary shaft when clutch 60 is engaged, and a second motion transmitting train 90, including the outer member 92 of an overrunning clutch, connects the auxiliary shaft to the output shaft of the first stage unless the second motion transmitting train overruns the auxiliary shaft. A first centrifugal clutch is connected between the input shaft and the output shaft of the first stage. At a low idle speed of the input shaft 24, the second centrifugal clutch is disengaged and no motion is transmitted to the auxiliary or output shaft of the first stage, or to the second stage, as shown in Table F.

TABLE F

| | SPEED RATIOS | | |
| --- | --- | --- | --- |
| Input | First Stage | Second Stage | Output |
| 1. Low Idle | | | Stationary |
| 2. Low | Low | Low | 1st Speed Forward |
| 3. High | High | Low | 2nd Speed Forward |
| 4. Low | Low | High | 3rd Speed Forward |
| 5. High | High | High | 4th Speed Forward |
| 6. Low | Low | Reverse | 1st Speed Reverse |
| 7. High | High | Reverse | 2nd Speed Reverse |
| 8. Low or High | | Idle | High Idle |

By way of example, the low idle input speed of an off-the-road vehicle, such as a snowmobile, might be 0-2500 RPM as shown in Table G.

TABLE G

| Input (24) | Range of Input (RPM) | Ratio | Output | Range of Output (RPM) (156) |
| --- | --- | --- | --- | --- |
| 1. Low Idle | 0–2500 | | Stationary | 0 |
| 2. Low | 2500–6000 | 0.60 × 0.29 = 0.16 | 1st Speed Forward | 450–960 |
| 3. High | 4000–7000 | 1.0 × | 2nd Speed | 1160–2030 |

TABLE G-Continued

| Input (24) | Range of Input (RPM) | Ratio | Output | Range of Output (RPM) (156) |
|---|---|---|---|---|
| 4. Low | 2500–6000 | 0.29 = 0.29 0.60 × 1.0 = 0.60 | 3rd Speed Forward | 1500–3600 |
| 5. High | 4000–7000 | 1.0 × 1.0 = 1.0 | 4th Speed Forward | 4000–7000 |
| 6. Low | 2500–6000 | 0.6 × (−0.4) = −.24 | 1st Speed Reverse | (−600) – (−1440) |
| 7. High | 4000–7000 | 1.0 × (−0.4) = −0.4 | 2nd Speed Reverse | (−1600) – (−2800) |
| 8. Low or High | 0–7000 | | High Idle | 0 |

As the speed of the input shaft increases to a first predetermined speed (say between 2500 to 5000 RPM, for example), the second centrifugal clutch 60 automatically engages to dirve the auxiliary shaft and the output shaft at a low speed. In a typical snowmobile, the speed ratio of the first stage might, for example, be 0.60 to produce a rotation of output-input shaft 32 of 1500 to 3000 RPM. When the speed of the input-output shaft 32 increases to a predetermined speed of say 3000 RPM, the first centrifugal clutch 28 automatically engages to connect the output shaft of the automatic stage directly to the input shaft of the automatic stage for a 1.0 speed ratio through the first stage of the transmission. The second motion transmitting train continues to operate, but at no load, since the train overruns the auxiliary shaft by virtue of the overrunning clutch therebetween. It will be noted the first stage of the transmission shifts automatically between a condition of no output speed, a low output speed and a high output speed, without engaging or disengaging gears.

The manually operated stage of the transmission consists of the single epicyclic motion transmitting train including the sun gear unit, the ring gear unit, and the planet gear unit, all centered on axis A. The planet gears are continuously meshed with the ring gear and the sun gear. Two of the units (in this embodiment, the sun gear unit and the planet gear unit) can be selectively coupled and uncoupled to change the mode of operation of the stage from a low speed transmission (of, say 0.29), a high speed transmission (of, say, 1.0), or no output speed (regardless of the speed of input to the first stage). Two of the units (in this embodiment the planet gear unit and the ring gear unit) can be alternately connected to the output for different mode operation. The planet gear unit can also be held (when disconnected from the output) for reverse drive of the output.

The input shaft 24 of the automatic stage is connected to the engine of the vehicle and the output of the automatic stage is connected to the input of the manually operated epicyclic stage. The output of the epicyclic stage is connected to the load which, in the embodiment of the invention illustrated, is the track of a snowmobile. It will be noted, from Tables G and F, that the different modes of operation of the manual second stage of the transmission can be coupled selectively with the different modes of operation of the first stage of the transmission to produce a wide variety of output speeds and modes from the transmission. As shown in Tables F and G, the transmission can produce no output speed, four speeds forward and two speeds in reverse.

With the construction disclosed, all the gears of the transmission remain in continuous engagement. Not a single gear of the transmission need be moved into or out of engagement with any other gear, and there can, therefore, be no clashing of gears. All speed changes are effected by automatic engagement or disengagement of centrifugal clutches or by selective coupling or uncoupling of the gear carriers of the gear units, and not by coupling or uncoupling of the gears themselves. Thus, speed changes can be effected while the gear units are rotating, without clashing or without any deleterious effects on the transmission.

Although the above described transmission has particular untility in small off-the-road vehicles, other uses exist for the transmission. For example, the transmission can be used for power operated tools or machine tools, inboard or outboard marine engines and other uses. In fact, the transmission of the present invention can be used for any application in which a transmission is required or desired. It will be evident that ratios and speeds, other than those indicated in Table G, can be produced.

Although the best mode contemplated for carrying out the present invention has been herein shown and described, it will be apparent that modification and variation may be made without departing from what is regarded to be the subject matter of the invention.

What is claimed is:

1. A transmission having an automatic stage and a manual stage, said transmission having a connecting shaft between the automatic stage and the manual stage, said automatic stage comprising an input shaft rotatable at varying speeds, a first centrifugal clutch mounted on said connecting shaft, an auxiliary shaft, a second centrifugal clutch and an overrunning clutch mounted on said auxiliary shaft, a first drive train connected between said first centrifugal clutch and said second centrifugal clutch, a second drive train connected between said overrunning clutch and said connecting shaft, said input shaft connected to said second centrifugal clutch through said first drive train to operate said second centrifugal clutch and drive said connecting shaft through said two driving trains and said auxiliary shaft after a predetermined speed of the input shaft is attained, said first centrifugal clutch operated after a predetermined speed of said connecting shaft is attained to drive said connecting shaft directly from said input shaft, and said manual stage consisting of an epicyclic train comprising a sun gear unit mounted on said connecting shaft, a ring gear unit, and a planet gear unit between said sun gear unit and said ring gear unit for continuously meshing engagement therewith, an output shaft selectively connected to one or the other of the ring gear unit and the planet gear unit, and means manually to couple selected ones of said epicyclic gear units together to drive the output shaft at a selected speed ratio to the speed of said connecting shaft.

2. The mechanism of claim 1 wherein said input shaft, said connecting shaft, and said output shaft are mounted on a common axis.

3. The mechanism of claim 2 wherein said input shaft, said connecting shaft, and said output shaft are connected together at a predetermined one of the speed ratios of the transmission for rotation in unison on said common axis.

* * * * *

UNITED STATES PATENT OFFICE
CERTIFICATE OF CORRECTION

PATENT NO. : 3,884,097
DATED : May 20, 1975
INVENTOR(S) : STELLIOS ANTONY AVRAMIDIS et al

It is certified that error appears in the above-identified patent and that said Letters Patent are hereby corrected as shown below:

```
Col. 2, line 63, change "39" to --38--.
Col. 3, line 10, change "member" to --members--;
        line 20, change "52" to --62--.
Col. 5, line 52, change "left" to --"left"--;
        same line, change "right" to --"right"--.
Col. 7, line 55, change "Table" to --Tables--.
Col. 9, line 12, change "(-600)" to -- -600 --;
        line 13, change "(-1440)" to -- -1440 --;
        line 23, change "dirve" to --drive--.
```

Signed and Sealed this thirtieth Day of December 1975

[SEAL]

Attest:

RUTH C. MASON
*Attesting Officer*

C. MARSHALL DANN
*Commissioner of Patents and Trademarks*